Patented Dec. 9, 1941

2,265,824

UNITED STATES PATENT OFFICE 2,265,824

PRODUCTION OF AMINOTRIAZINE MIXTURES

Jack T. Thurston and John Marshall Grim, Stamford, Conn., assignors to American Cyanamid Company, New York, N. Y., a corporation of Maine No Drawing. Application October 28, 1939, Serial No. 301,766

15 Claims. (Cl. 260—248)

This invention relates to the production of aminotriazine mixtures, and more particularly to a method of preparing an aminotriazine mixture which is especially well suited for condensation with aldehydes for the production of synthetic resins.

In the copending application of Frank J. Groten and James H. Lower, Serial No. 256,772, filed February 16, 1939, there is described a method of preparing molding compositions. The resinous constituent of the molding compounds described and claimed in that application is an aldehyde condensation product of a material obtained upon heating dicyandiamide and a phenol with evolution of ammonia.

The present invention constitutes an improvement in certain of the process steps described in detail in the Groten and Lower application, and relates particularly to an improvement in the heat conversion of the dicyandiamide. An object of the invention is to materially shorten the time of this heating period. A further object is to employ cyanamide, the monomer of dicyandiamide, as a raw material in the process if desired. Still further objects will become apparent from the following description when taken with the claims attached thereto.

We have found that an aminotriazine mixture suitable for condensing with aldehydes for the production of synthetic resins of excellent light-stability and molding characteristics is obtained when either dicyandiamide or cyanamide, or mixtures of the two, is heated in the presence of a small amount of an acid condensing agent such as zinc chloride, aluminum chloride, calcium chloride and the like. The heating may be carried out at the temperatures previously employed in the absence of a condensing agent; i. e. about 181–212° C., or at substantially lower temperatures, but we have found that in all cases the heating time can be substantially reduced when an acid condensing agent is used. This is important in commercial resin manufacture, for it permits a great increase in the amount of aminotriazine mixture that can be produced in any given size of equipment per unit of time and therefore reduces the cost of the process.

A dry mixture of the cyanamide or dicyandiamide and condensation catalyst may be heated together in accordance with our invention or the heating may be carried out in the presence of a liquid heating medium. In addition to the phenolic solvents described in the application above referred to, it is possible to obtain a satisfactory conversion of cyanamide or dicyandiamide to aminotriazines in a large number of other liquid heating media in the presence of an acid condensing agent. Thus, for example, we have obtained satisfactory conversions in hydrocarbon solvents or dispersing agents such as naphthalene, alpha and beta pinene, xylene and the like, in aromatic alcohols such as benzyl alcohol, in cyclohexanol, in aliphatic alcohols such as butanol, in compounds containing ether groups such as the ethyl ether of ethylene glycol, and in other miscellaneous solvents such as ethylene chlorhydrin, chlorinated diphenyl, ketones and the like. Accordingly it should be understood that in its broader aspects our invention is directed to any process of converting dicyandiamide or cyanamide to aminotriazine mixtures by heating them in the presence of small amounts of acid condensing agents, irrespective of the type of heating medium used. On the other hand, however, phenols or phenolic mixtures containing cresols, xylenols and the like appear at the present time to be by far the most valuable heating media, for reasons which will subsequently be explained, and for this reason the conversion of dicyandiamide and cyanamide with small amounts of acid condensing agents in the presence of these materials constitutes a preferred embodiment of our invention.

The acid condensing agent or catalysts which may be used in practicing the process of our invention include any of the reagents of this nature that have previously been used in bringing about organic condensation reactions. This includes, as is well known, such materials as anhydrous zinc chloride, aluminum chloride, ferric chloride, antimony chloride, tin chloride, and the like, but we have found that anhydrous zinc chloride produces the most satisfactory results. Since all these materials are most effective when used in extremely small amounts, we believe that they function as true catalysts to accelerate the conversion of cyanamide or dicyandiamide to aminotriazines, although the invention is not limited by the exact nature of this action. The acid condensing agents are most effective in amounts of 0.01 to 0.001 mole for each mole of dicyandiamide present which means, of course, that when cyanamide is used the amount of condensing agent should be reduced by half. Amounts of catalyst up to 0.1–0.2 mole per mole dicyandiamide may be employed in some cases, but when larger amounts are used it will usually be found that inferior results are obtained.

In carrying out the process of our invention the cyanamide or dicyandiamide is preferably dispersed in a liquid heating medium, such as any of those described above, and small amounts of the acid condensing agent are then added. The materials are heated together, usually by refluxing at the boiling point of the solvent, until the requisite degree of conversion into aminotriazines has been obtained. The reaction can usually be followed by observing the amount of ammonia given off, and for most purposes the conversion may be regarded as complete when from 0.13 to 0.18 mole of ammonia per mole of dicyandiamide are liberated. By further heating, particularly at higher temperatures, it is possible to expel as much as 0.2 mole of ammonia for each mole of dicyandiamide charged, but in this case the characteristics of the resulting aminotriazine mixtures are not as desirable for the preparation of molding compounds. In some cases even less conversion may be desired, and we have obtained resins of good properties with the evolution of as little as 0.07–0.10 mole of ammonia per mole of dicyandiamide. It is understood, therefore, that the invention is not restricted to processes in which a complete conversion is obtained, as indicated by a complete evolution of ammonia, and that the term "heating" in the following claims is intended to include any process in which the heating is continued until a substantial amount of the dicyandiamide or cyanamide has been converted to an aminotriazine mixture. In the preparation of very light colored molding compounds it is frequently desirable to carry out the refluxing in an atmosphere of an inert gas such as nitrogen or carbon dioxide in order to exclude oxygen.

It will be noted that our invention, as outlined above, includes two distinct types of processes. The preferred type is that in which the heating medium is a material such as a phenol which is capable of condensing with an aldehyde to produce a synthetic resin. In this case the heating medium is itself an ingredient of the final resinous composition, and it is only necessary to add the aldehyde in suitable proportions and carry out the resin formation in the usual manner, preferably after adjusting the pH to about 7.5–10. The second type of process is that in which the heating medium is a hydrocarbon, an alcohol, or other material which is not so well suited for incorporation into a finished resin, and in this case it is preferably separated from the aminotriazine product. In practically all cases this separation involves only a simple filtration or centrifuging step, for the aminotriazine mixture which is the reaction product is practically insoluble therein. Accordingly when such solvents are used the reaction mixture is cooled, filtered or centrifuged, and the resulting reaction product may be condensed with an aldehyde or used for any other purpose.

The invention will be illustrated in greater detail by the following specific examples. It is understood, however, that although these examples may show certain of the more specific aspects of the invention they are given primarily for purposes of illustration and that the invention in its broader aspects is not limited thereto.

Example 1

358 parts by weight of dicyandiamide, 411 parts of 39.5° phenol and 1.8 parts of anhydrous zinc chloride were mixed together and heated at the refluxing temperature of the phenol (about 181° C.) for two hours with continuous agitation. During the heating a current of carbon dioxide gas was passed through the mixture to avoid oxidation and to expel ammonia as fast as it was formed. After the two hour heating period the heat was shut off and the mixture allowed to cool while the agitation was still running, carbon dioxide still being passed through the batch in order to expel the last traces of ammonia. When the batch temperature was 100° C. the carbon dioxide was shut off and 910 parts of 37.5% aqueous formaldehyde were stirred in. The contents of the kettle were then adjusted to a pH of 7.6 by the addition of 5N sodium hydroxide solution and the mixture was refluxed for one hour at 97° C.

The batch was then transferred to a steam jacketed kettle and dehydrated under a 21 inch vacuum until substantially all the water was removed. A hard, brittle resin was obtained which after cooling was readily grindable.

A molding composition was prepared by mixing 570 parts by weight of the resin, 5.7 parts of benzoic acid and 5 parts of calcium stearate. This mixture was ground in a ball mill for 1½ hours after which 430 parts of alpha-pulp (200 mesh) were added and the grinding continued for an additional 1½ hours. The blended resin and filler were then compounded on steam heated rolls at 110° C. for 1–1.5 minutes after which the rolled sheets were ground in a hammer mill to proper granulation size for pelleting.

The resulting molding compound could be molded into small objects in 1½–4 minutes. Molded parts showed no surface cracks when subjected to drastic changes in humidity, or when subjected to ½ hour of boiling in water, then dried and subjected to 14 hours in live steam and dried again. The light resistance of the molding was good and their electrical properties were excellent.

Similar compositions are obtained when the 39.5° phenol is replaced by synthetic phenol, by 82% phenol, or by cresols such as "Barrett No. 8 Cresol" or "Barrett cresylic acid (212° C.)."

Example 2

336 parts by weight of dicyandiamide were heated with 600 parts of naphthalene and 3.4 parts of anhydrous zinc chloride. The mixture was heated to the boiling point of naphthalene and refluxed for 15 minutes, at which time 0.2 mole of ammonia had been given off for each mole of dicyandiamide charged. The mixture was then cooled somewhat, the molten naphthalene was poured off, and the reaction product was pulverized, washed with benzol and dried.

200 parts of the aminotriazine mixture which contained melamine and its deamination products was added to 240 parts of 40% aqueous formaldehyde solution, the pH was adjusted to 7.9 by addition of triethanolamine and the mixture was refluxed at 97° C. for 25 minutes. The resin was then dehydrated as in Example 1 and after pouring and cooling was molded without the addition of a filler. It formed an almost transparent molding.

Example 3

252 parts by weight of dicyandiamide, an equal weight of the ethyl ether of ethylene glycol and 10 parts of anhydrous zinc chloride were refluxed for 2½ hours. The mixture was then cooled, the liquid heating medium was filtered off and the reaction product was analyzed. It was found to contain 67% of melamine, 11% of melamine deamination products, and 18% of unreacted dicyandiamide.

Example 4

252 parts by weight of dicyandiamide, 25 parts of anhydrous zinc chloride and 252 parts of beta-pinene were heated with stirring at 160-165° C. for 5 hours. The heat was then removed, the beta-pinene poured off and the solid product cooled, washed and analyzed. It was found to contain 65% of melamine, 28% of water-insoluble melamine deamination products and 7% of unreacted dicyandiamide.

Example 5

252 parts by weight of dicyandiamide and 15 parts of $SnCl_4 \cdot 5H_2O$ were suspended in 252 parts of cyclohexanol and the mixture was heated at 150-160° C. for 4 hours.

The heat converted product was separated from the liquid heating medium and was then reacted with 300 parts of 40% aqueous formaldehyde solution as in Example 2. Clear, transparent moldings were obtained.

What we claim is:

1. A method of preparing an aminotriazine mixture which comprises heating a member of the group consisting of cyanamide and dicyandiamide in the presence of an acid condensing agent in amounts not more than 0.2 mole per mole of dicyandiamide.

2. A method of preparing an aminotriazine mixture which comprises heating a member of the group consisting of cyanamide and dicyandiamide in the presence of anhydrous zinc chloride in amounts not more than 0.2 mole per mole of dicyandiamide.

3. A method of preparing an aminotriazine mixture which comprises heating a member of the group consisting of cyanamide and dicyandiamide in the presence of a small amount of anhydrous zinc chloride, said amount being on the order of 0.01-0.001 mole per mole of dicyandiamide.

4. A method of preparing an aminotriazine mixture which comprises heating a member of the group consisting of cyanamide and dicyandiamide in an inert liquid heating medium in the presence of a small amount of an acid condensing agent in amounts not more than 0.2 mole per mole of dicyandiamide.

5. A method of preparing an aminotriazine mixture which comprises heating a member of the group consisting of cyanamide and dicyandiamide in an inert liquid heating medium in the presence of a small amount of zinc chloride in amounts not more than 0.2 mole per mole of dicyandiamide.

6. A method of preparing an aminotriazine mixture which comprises heating a member of the group consisting of cyanamide and dicyandiamide in an inert liquid heating medium in the presence of a small amount of zinc chloride, said amount being on the order to 0.01-0.001 mole per mole of dicyandiamide.

7. A method of preparing an amino-triazine mixture which comprises heating a member of the group consisting of cyanamide and dicyandiamide in a liquid phenolic heating medium in the presence of a small amount of an acid condensing agent.

8. A method of preparing an aminotriazine mixture which comprises heating a member of the group consisting of cyanamide and dicyandiamide in a liquid phenolic heating medium in the presence of a small amount of anhydrous zinc chloride.

9. A method of preparing an aminotriazine mixture which comprises heating a member of the group consisting of cyanamide and dicyandiamide in a liquid phenolic heating medium in the presence of a small amount of anhydrous zinc chloride, said amount being on the order of 0.01-0.001 mole per mole of dicyandiamide.

10. A method of preparing an aminotriazine mixture suitable for condensing with an aldehyde to form a synthetic resin which comprises heating a member of the group consisting of cyanamide and dicyandiamide with a phenol in the presence of a small amount of an acid condensing agent until substantial quantities of ammonia have been evolved.

11. A method of preparing an aminotriazine mixture suitable for condensing with an aldehyde to form a synthetic resin which comprises heating a member of the group consisting of cyanamide and dicyandiamide with a phenol in the presence of a small amount of anhydrous zinc chloride until substantial quantities of ammonia have been evolved.

12. A method of preparing an aminotriazine mixture suitable for condensing with an aldehyde to form a synthetic resin which comprises heating a member of the group consisting of cyanamide and dicyandiamide with a phenol in the presence of a small amount of anhydrous zinc chloride, said amount being on the order of 0.01-0.001 mole per mole of dicyandiamide, until substantial quantities of ammonia have been evolved.

13. A method of preparing an aminotriazine mixture suitable for condensing with an aldehyde to form a synthetic resin which comprises heating a member of the group consisting of cyanamide and dicyandiamide with a cresol in the presence of a small amount of an acid condensing agent until substantial quantities of ammonia have been evolved.

14. A method of preparing an aminotriazine mixture suitable for condensing with an aldehyde to form a synthetic resin which comprises heating a member of the group consisting of cyanamide and dicyandiamide with a cresol in the presence of a small amount of anhydrous zinc chloride until substantial quantities of ammonia have been evolved.

15. A method of preparing an aminotriazine mixture suitable for condensing with an aldehyde to form a synthetic resin which comprises heating a member of the group consisting of cyanamide and dicyandiamide with a cresol in the presence of a small amount of anhydrous zinc chloride, said amount being on the order of 0.01-0.001 mole per mole of dicyandiamide, until substantial quantities of ammonia have been evolved.

JACK T. THURSTON.
JOHN MARSHALL GRIM.